TOP VIEW

BOTTOM VIEW

INVENTOR
Lincoln Walsh
BY

DISTRIBUTION IN PLANE PERPENDICULAR TO AXIS

ALL FREQUENCIES

DISTRIBUTION IN PLANE OF AXIS

United States Patent Office 3,424,873
Patented Jan. 28, 1969

3,424,873
COHERENT-SOUND LOUDSPEAKER
Lincoln Walsh, 3 Old Farm House Road,
Millington, N.J. 07946
Filed July 15, 1964, Ser. No. 382,711
U.S. Cl. 179—115.5
Int. Cl. H04r 9/06
7 Claims

ABSTRACT OF THE DISCLOSURE

The coherent-sound loudspeaker is a development derived from a theoretical concept of ideal sound reproduction by means of a conical diaphragm operating as a wave transmission line. Such a conical diaphragm will produce sound as it would be produced by a small cylinder pulsating radially with every portion of its area moving in and out simultaneously, and in phase with the input audio signal. This is coherent sound.

The requirements of the theoretical concept are closely approached by a sound producer of the following character:

(1) The angle of the conical diaphragm, measured from a plane perpendicular to its axis is quite high, causing the speed of the mechanical vibratory waves in the diaphragm to be greater than the speed of sound in air, and to have a component in the desired direction of sound radiation equal to the speed of sound in air.

(2) Absorbing material absorbs the wave energy in the diaphragm to eliminate or minimize wave reflections from the non-driven end, so that a vibratory wave traverses the diaphragm substantially only once.

(3) Sound is radiated to the listener only from the convex side of a vertical conical diaphragm to obtain full frequency range, high quality sound omnidirectionally from a single radiator.

---

This invention relates to sound reproducers or loudspeakers, particularly those in which the sound radiating surface is a curved diaphragm of conical or similar shape.

The prime objective is to reproduce music and speech and other sounds from an electrical signal input of audio frequency more accurately and with better spatial distribution with a single loudspeaker than is possible with any previously known loudspeaker or combination of loudspeakers, thereby giving more enjoyment to the listener and more intelligibility to voice communication. Essential to this objective is that the sound transmitted from the loudspeaker to the listener's ear reproduced from a single "bit" of audio input signal shall all arrive at the same instant. This is "coherent sound."

Another objective to to attain the above improvements in a device that is basically simple, readily reproducible in manufacture, and low in cost.

A further objective is to attain excellent performance over substantially the entire audible frequency range in a single loudspeaker unit.

A further objective is to obtain the above improvements in either a small unit or in a large unit of very high power handling capacity.

A further objective is to develop a new type of loudspeaker which can be designed over its complete range of characteristics by rational analytical methods in contrast to the "cut and try" empirical procedures now prevalent in loudspeaker development.

A further objective is to make the loudspeaker-enclosure combination novel and attractive in appearance, as well as much better in audio listening quality.

Other objectives will become apparent as the invention is described.

The Coherent-Sound Loudspeaker is an improved sound reproducer in which a diaphragm that is an organized traveling-wave radiation reproduces each single "bit" of sound in one instant or coherently. This is in contrast to conventional loudspeakers in which a diaphragm that is a thoroughly disorganized piston spreads one "bit" of sound over a relatively long period of time causing originally distinct sounds to overlap each other and blur. This is non-coherent sound.

This invention is an improvement in sound reproducers in which the sound generating element is a diaphragm, vibrated by a voice coil, in which the vibrations travel across the diaphragm as waves in organized fashion at supersonic velocity, once only. The wave energy is then absorbed.

The sound is produced by the convex side of a conical diaphragm with its axis vertical, which acts as a radiating terminated mechanical wave transmission line at high frequencies, and makes a smooth transition to closely approximate a rigid piston at the lowest frequencies.

The sound produced is coherent, because the diaphragm is completely effective in that all parts cooperate to deliver one "bit" of audio signal in the electrical input to the listener's ear in one instant. There is no hangover or delay.

The sound diffusion is inherently omni-directional in a plane perpendicular to the axis.

By analysis and control of wave velocity, damping, and diaphragm shape, it is theoretically possible to deliver perfect sound reproduction at the ears of the listeners. In practice, single-unit intermediate prototypes have performed in a manner that qualified listeners have judged to be far superior to conventional multi-unit loudspeakers.

In contrast to this, in a conventional loudspeaker the diaphragm approximates a rigid piston at low frequencies and becomes a completely disorganized vibrating surface at middle and high frequencies. The pattern of vibrations is made up of many irregular standing waves and nodes, and the pattern changes rapidly with small changes of frequency. The sound output is the vectorial resultant of a multitude of wave motions of the various parts of the diaphragm. It differs considerably on the axis and at various angles away from the axis.

Because this diaphragm action is so disorganized and changeable with frequency, it cannot be analyzed or predicted. Design is on a purely "cut and try" basis to obtain the desired tone balance and the widest possible frequency range. The complicated action of the diaphragm is the result of (1) the subsonic velocity of the vibratory waves, (2) the multitude of wave reflections, which persist for several hundredths of a second, and (3) the irregularities of the material which are accentuated by the multiple reflections.

R. W. Leonard says: " . . . The preceding discussion assumes that the loudspeaker cone moves as a rigid unit. This assumption is reasonably good up to about 500 c.p.s., but not valid above this range for large cones. The paper cone has normal modes of vibration having radial nodal lines and/or nodal circles. The presence of the standing flexural waves on the cone has a marked effect on the radiated sound. These standing waves may result in peaks and dips in the axial pressure frequency curved separated by as much as 10 db. Corrington (1)* has made a systematic study of these effects."(2)

The basic element of this invention is a sound-producing diaphragm, usually conical, into which vibratory energy is fed, and in which the vibrations travel radially from the driven end to the far end as waves at a velocity or speed greater than the speed of sound waves in the air—supersonic velocity. This velocity in the diaphragm of the vibratory waves and the angle of the diaphragm should be ideally such that the components of this velocity in the direction of optimum desired sound radiation is approximately equal to the velocity of sound waves in air.

A second element of the invention is the means by which the wave energy is absorbed completely or substantially so after the waves have traveled in the diaphragm from the driven end to the far end and have radiated the desired sound waves. Thus there is practically no wave energy reflected back toward the driven end and the production of delayed, and thus spurious sound waves is eliminated. These delayed sound waves cause undesirable sound effects which are included in the term "transient effects."

Another element of the invention is the development of the relationship of the mechanical impedance of the voice coil to the mechanical impedance of the conical diaphragm at the driven end.

Another element of this invention lies in the means of selectively absorbing the energy of the sound waves in air produced by the residual reflected waves in the diaphragm.

Further, an ancillary but very essential part of the development of the invention was the synthesis of a two-dimensional equivalent of the three-dimensional conical diaphragm, which permits mathematical analysis of diaphragm wave motion for the first time. Also the development of the method of measuring the motion of a small area of the cone in three dimensions.

If the velocity of the sound producing vibratory waves is of the correct supersonic value for the angle and constant throughout the diaphragm and over the frequency range and if further the wave energy is completed absorbed at the far end the radiation effectiveness will be uniform or will vary smoothly over the desired range of frequencies, and delayed sound waves or transient effects will be substantially zero.

Referring to the drawings:

FIGURE 10 is a diagram showing a cabinet containing a loudspeaker of the type shown in FIGURE 1.

FIGURE 11 is a diagram showing three views of a coffee table type of cabinet containing a loudspeaker of the type shown in FIGURE 1.

FIGURE 12 is a diagram showing a stereo cabinet containing a loudspeaker of the type shown in FIGURE 1, as well as a television receiver.

FIGURE 13 is a diagram showing the principles of operation of a machine for producing conical felted fiber diaphragms having the desired properties for use in this invention.

Figure 1A:
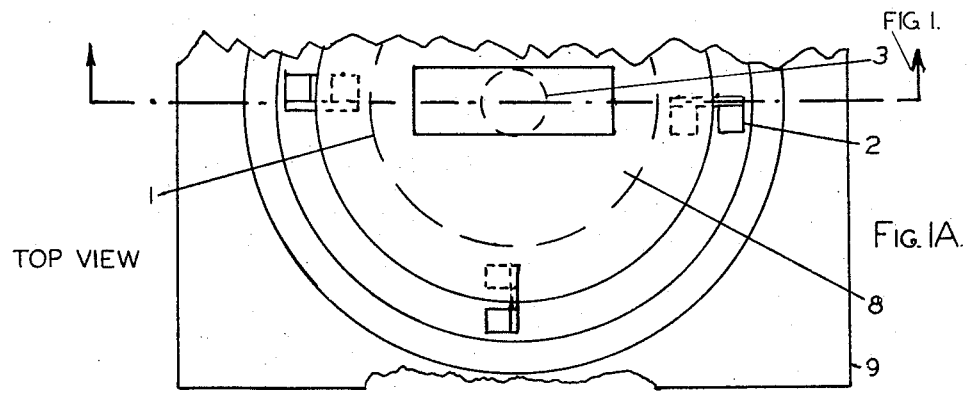
FIGURE 1 is a diagram of one preferred physical configuration of this invention showing the loudspeaker and its associated baffle.
Figure 1:
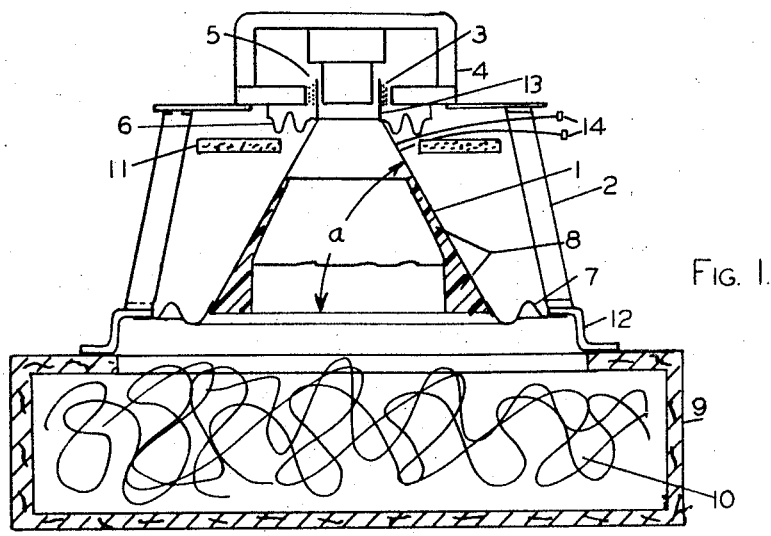
Figure 1B:
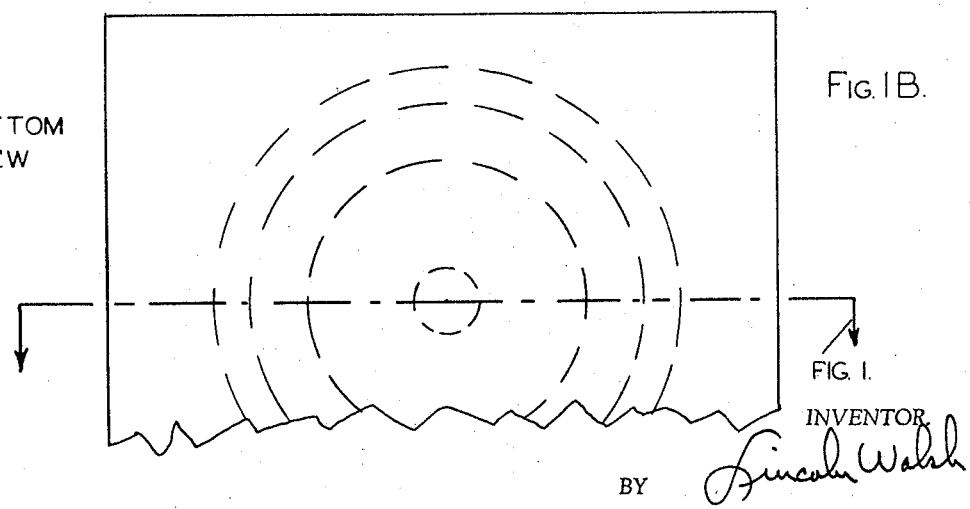

The physical configuration of one preferred form of this invention is shown in FIGURE 1. It consists of a steep-angled conical diaphragm 1 supported by a mechanical framework 2 so that it is free to vibrate axially within certain limits and constrained radially. The axis is normally vertical. Sound waves in air are produced and travel outward radially from the convex side, uniformly in all directions around the vertical axis, to the areas where the listener's ears might be located. Sound waves produced by the concave side of the diaphragm are absorbed or restricted by the enclosure or baffle.

Other members of the physical configuration shown in FIGURE 1 include (a) the voice coil 3 coupled by voice coil tube 13 to the smaller end of the diaphragm and located in a circular magnetic field 5 so as to apply vibratory force to the diaphragm in accordance with variations in the alternating electrical input signal to the voice coil 3; (b) a magnetic structure 4 containing the circular magnetic gap 5 in which the voice coil 3 is located; (c) means 6 for holding the smaller end of the diaphragm 1 and the voice coil 3 central, but free to move axially; (d) means 7 for holding the larger end of the diaphragm 1 central, but free to move axially, and for sealing the annular opening against air leakage; (e) means 8 which may be combined with centering and sealing means 7, for absorbing the energy of waves or vibrations at the larger end of the diaphragm 1 and also in the body thereof; (f) a baffle 9 enclosing the larger end of the diaphragm 1; (g) sound absorbing material 10 within the baffle; (h) sound absorbing material 11 surrounding the smaller end of the diaphragm; and (i) mounting ring 12.

Figure 2:
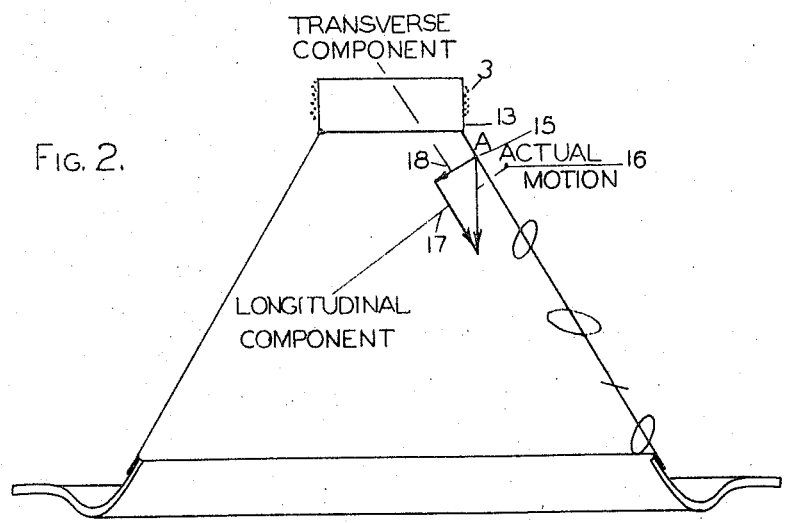
FIGURE 2 is a diagram showing the diaphragm and voice coil. The motions of the individual points of the diaphragm, when subjected to the action of the mechanical vibratory waves traveling through the diaphragm from the smaller driven end to the larger non-driven end, are shown, greatly manifested, as ellipses or straight lines.

FIGURE 2 shows in greatly magnified form the general nature of the motion of points of a conical diaphragm when vibrated. When an alternating signal current flows through the voice coil 3, a reciprocating or vibrating force, parallel to the axis, is applied to the conical diaphragm at the driving circle where the voice coil tube 13 couples to the diaphragm 1. This vibration at the driving circle is not transferred instantly to the entire conical diaphragm, but rather progressively as a wave motion. This wave motion has a definite velocity depending upon the properties and configuration of the diaphragm which I have found to be a key factor in obtaining effective transfer of the vibratory energy from the diaphragm to the contiguous air. A point 15 on the diaphragm at the driving circle vibrates in a straight line as shown in FIGURE 2, which is a view of a section showing a radial plane. The vibration of points on the diaphragm at larger radii than point 15 is not the same straight-line motion parallel to the axis, but rather ellipses which vary in amplitude, shape, and direction along the general lines shown in FIGURE 2. The straight-line motion 16 of point 15 can be considered as having two vectors, one longitudinal along a slant radius as shown at 17, and one transverse as shown at 18. The change in motion from the straight-line motion of point 15 to the elliptical motion of other points is the result of the vibratory or mechanical characteristics of the conical diaphragm when it is considered as a wave transmission line. Only the transverse component of motion produces air displacement, or sound. The longitudinal component is of interest only as it is coupled to the transverse component of the wave.

The velocity of wave propagation varies considerably as the wave travels from the driving circle to the outer edge, usually increasing toward the outer edge.

At very low frequencies the length of a wave is several feet, many times the length of the slant radius of the diaphragm. Therefore the phase difference between the driving circle and the non-driven edge is a small part of a cycle, and the whole diaphragm seems to be moving with all areas moving in unison, as a rigid piston, when observed under stroboscopic light. At middle and high frequencies, the wave motion in the diaphragm becomes clearly visible under stroboscopic light.

Figure 3A:
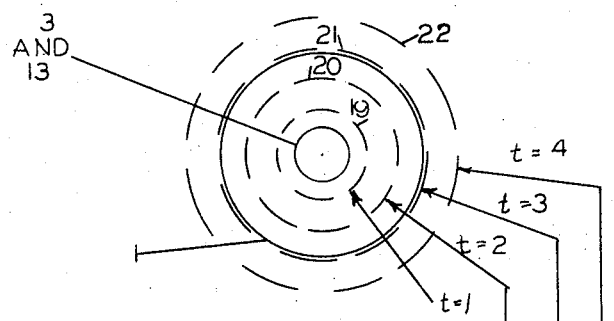
FIGURE 3 is a series of diagrams of the diaphragm showing the progress of a vibratory wave in the diaphragm when the wavelength is smaller than the radial distance of the diaphragm, and the resultant sound wave front in air.

FIGURES 3a to 3e show a simplified representation of a conical diaphragm 1, voice coil 3, and voice coil tube 13, taken from FIGURE 1. They also show the progress of a vibratory wave in the diaphragm and the resultant wave front of the sound in air. FIGURE 3a is a top view of the diaphragm, which is mounted with its axis vertical.

Figure 3B:
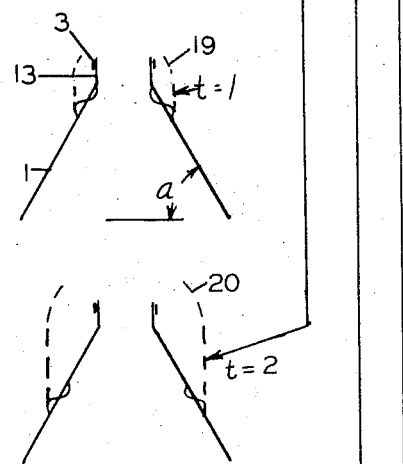

In FIGURE 3b, at time $t$ equal to 1 a single cycle of a vibratory wave, shown exaggerated, has been transmitted into the diaphragm by the voice coil. The sound wave front as it exists at $t$ equal to 1 is shown in dashed lines 19. The top view, FIGURE 3a, shows the wave front as a circle at time $t$ equal 1.

Figure 3C:
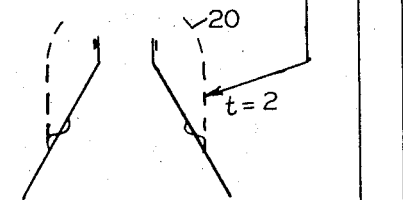
Figure 3D:
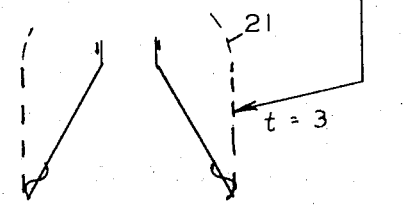
Figure 3E:
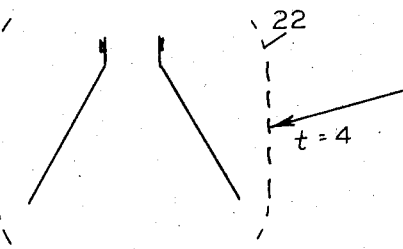

FIGURES 3c, 3d, and 3e show successively at intervals of a fraction of a millisecond the positions 20, 21, and 22 of the vibratory wave and of the wave front in air which the vibratory wave generates as it moves down the diaphragm at supersonic velocity. If the transverse component of the wave motion in the diaphragm has a constant velocity $v_{td}$ equal to the sound velocity in air $v_a$ multiplied by the factor $1/\cos a$ where $a$ is the angle between diaphragm slant radius and a plane perpendicular to the axis, the wave front as shown in FIGURES 3b to 3e will parallel to the axis, and as shown in FIGURE 3a it will be circular and initially cylindrical. The sound wave in air will thus be radiated primarily in a horizontal plane. The sound wave fronts will curve in the direction of being spherical above and below the diaphragm as indicated.

If the wave velocity in the diaphragm $v_{td}$ is supersonic but less than $$v_a \frac{1}{\cos a}$$

the wave fronts will tilt outward at the top, and the sound wave radiation will tend to be downward. If $v_{td}$ is greater than $$v_a \frac{1}{\cos a}$$

the wave fronts will tilt outward at the bottom, and the sound radiation will tend to be upward.

In FIGURES 3a to 3e, the sound waves generated by the inner surfaces of the diaphragm are not indicated as they are not radiated, but rather are absorbed or restricted by the enclosure 9, which is shown only in FIGURE 1.

All the various areas of the diaphragm shown in FIGURES 3a to 3e will be effectively in phase, although they are not actually so, and therefore the sound produced will be "coherent sound." The use of the word coherent herein is consistent with its use in the term "coherent light" as is produced by lasers.

All of the sound transmitted to the listener's ears from the loudspeaker from one "bit" of audio input signal will arrive at the same instant.

The sound waves will be the same as would be produced by a theoretical, but impractical radially pulsating cylinder. For the usual horizontally located audience, such a cylinder is substantially equivalent to the also impractical radially pulsating sphere. Such a sphere is the ideal form of sound radiating surface.

Thus by these means it is theoretically possible to construct a sound reproducer or loudspeaker that will have the following performance:

(1) Response uniform or varying smoothly over the desired range of audible or superaudible frequencies.

(2) No transient effects on middle and high audio frequencies.

(3) Sound radiation uniform in all directions around the vertical axis, and adequate vertically for usual listener distribution.

Conventional loudspeakers are seriously deficient in these three factors, and loudspeakers have been the greatest obstacles to perfect reproduction of sound.

The production of spurious tones, including harmonics, subharmonics, non-harmonics, amplitude modulation, and frequency modulation also degrades the quality of reproduction. The new loudspeaker also has advantages on these factors.

In a conventional loudspeaker the velocity in the conical diaphragm is subsonic and the component of velocity in the direction of desired sound radiation is a small fraction, one-quarter to one-tenth and frequently less, of sound velocity in air. Under these undesirable conditions a "bit" of sound reaches the listener's ear from the outer, or larger diameter, areas of the diaphragm later than that same bit from the inner areas. This difference may amount to two or more cycles at 4000 cycles per second.

Further, when the listener's ear is off the axis of the loudspeaker, a bit of sound from the near side of the diaphragm will reach the ear sooner than that same sound bit radiated from the far side. With a 6-inch diameter diaphragm this time difference amounts to one cycle to 4000 cycles with a 30-degree angle from the axis.

These two factors cause non-coherence in the radiated sound.

If the wave velocity in the diaphragm is less than the speed of sound in air, radiated sound waves in air do not at any time add completely. At all frequencies, there is some cancellation, and at certain frequencies there is almost complete cancellation. This is one of the major factors causing degradation of quality in loudspeakers of conventional design.

Further, in a conventional loudspeaker, to obtain the best possible tone balance and uniformity of response over the frequency range, changes are made in the basic material of the diaphragm, in angle, and in shape, and in the kind and amount of lacquer or other saturating material applied to the diaphragm. This variation is done on a "cut and try" basis. The result is usually that the damping of the vibrations and waves in the diaphragm is such that a single bit of signal persist for many milliseconds, in some cases as long as 20 milliseconds.

Further, in a conventional loudspeaker any sudden change of amplitude of a tone is followed by transient tones of relatively high amplitude that are a characteristic property of the loudspeaker and they have no relation to the music or voice tones. They are instead related to the resonance properties of the diaphragm.

In the new loudspeaker, these effects—non-coherence, transient effects, and resonance effects—are eliminated completely or substantially. The quality of the reproduced sound is brought much closer to the original by the large reduction in these quality degradation factors.

Several prototypes were built in general accordance with this invention, and in listening tests by qualified observers they have been judged superior in considerable degree to high-quality conventional loudspeakers.

This invention points the way to making the waveform of sound pressure a substantially perfect reproduction of the electrical signal input wave over the desired range of frequencies and loudness. As the best present-day microphones, amplifiers, and transmission means have relatively small quality degradation, this invention presents the possibility of a large step forward in the overall quality of sound reproduction. As the device is simple and easy to produce in large quantities, the cost should be low.

An essential part of the concept of this invention is the relation between the velocity of transverse waves traveling in a membrane $v_{tm}$, the velocity of sound in air $v_a$, and the pattern of the resulting sound waves in air.

Figure 4:
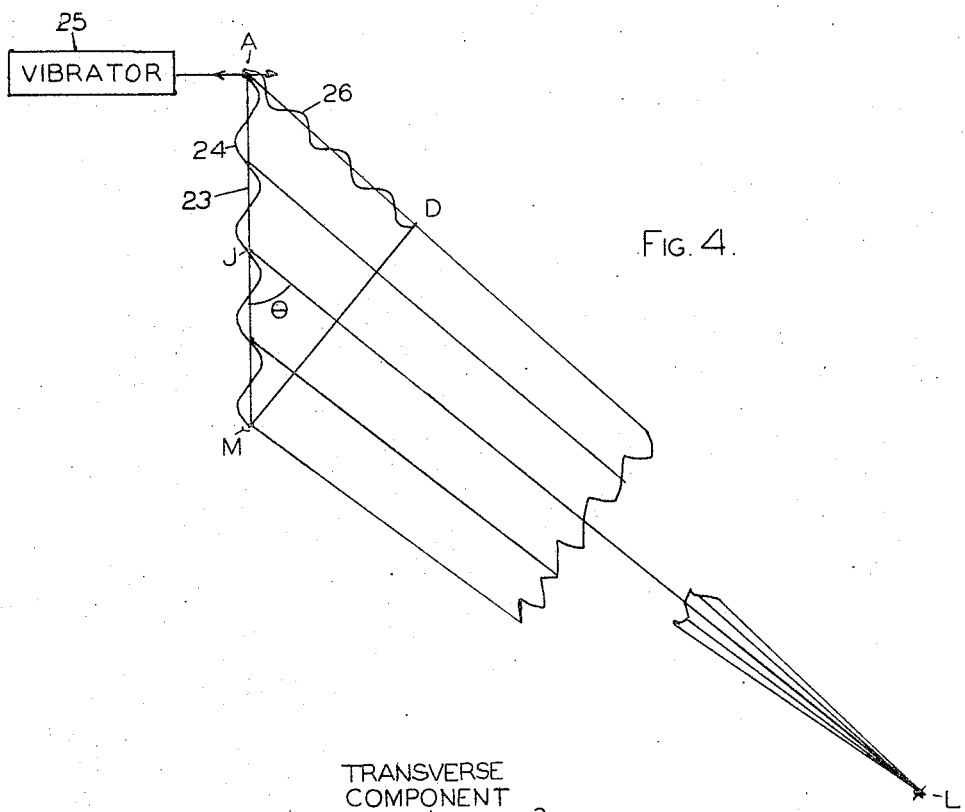
FIGURE 4 is a diagram showing supersonic vibratory wave motion in a membrane and the resultant sound wave motion in air, to illustrate the principles of this invention.

FIGURE 4 shows a section through a membrane 23 designated AM which is large in the direction perpendicular to the paper. Transverse waves 24 are produced in the membrane 23 at frequency $f$, by a vibrator 25 at a line which is the full dimension of the membrane perpendicular to the paper, which line is represented by point A.

The vibration is transmitted down the membrane 23 as a transverse wave motion at velocity $v_{tm}$, greater than the velocity of sound in air. This wave motion in the membrane 23 produces sound waves 26 in the air on both sides of the membrane 23 which are identical except that they are opposite in phase, but only those on the right-hand side will be considered.

Point L is a listening point of such distance that the straight lines from A to L and from M to L are almost parallel. The line from the center of the membrane J to L makes an angle $\theta$ with the membrane AM. Some of the wave energy will travel the direct air path from A to L, which is the shortest path. Some will travel down the membrane to intermediate points or to M, and then travel over the straight air paths to L. These paths are longer than the direct air path AL.

The time for the sound waves to travel the longer paths will be equal to the time for the shorter direct path when the velocity in the membrane $v_{tm}$ is higher than the velocity in the air $v_a$ by the factor $1/\cos \theta$.

Looking back from point L, the sound source will then seem to be a virtual membrane MD all areas of which are vibrating in unison and aiding each other. There will be no interference or cancellation, and the radiation of sound is coherent.

This coherent condition will apply at all frequencies if the wave velocity in the membrane $v_{tm}$ is the same for all frequencies.

The membrane AM forms the hypotenuse, and the virtual membrane MD forms one side of a right triangle, of which the other side is AD.

To obtain the condition of the virtual membrane vibrating all in phase as would a rigid piston, the number of wavelengths in the membrane AM should be the same as the number in the air path AD between the membrane and the virtual membrane. To obtain this relation requires that the velocity in the membrane $v_{tm}$ must always exceed the velocity in air by the ratio $1/\cos \theta$.

Or if the velocity in the membrane is given, then the angle of coherent sound radiation, which is the angle of maximum sound radiation is $\cos^{-1} v_a/v_{tm}$.

The effective width of the sound radiating surface for directivity purposes, in the plane of the paper, is approximately the width of the virtual membrane MD, which is the width of the membrane $AM \times \cos \theta$. At high frequencies, for example 16,000 cycles per second, the wavelength is 0.85 inch, and a membrane would have dimensions equal to several wavelengths. Then there would be a well defined directional quality to the sound beam. At a typical low frequency of 100 c.p.s., the wavelength is 11.3 feet. Then the membrane dimension would be only a small fraction of a wavelength, and the directivity effect is negligible. The directivity changes progressively from very broad at low frequencies where wavelengths are long compared go membrane dimensions, to narrow at high frequencies where wavelengths are very short compared to the membrane dimensions.

In the above discussion of vibrating membranes, in order to facilitate analysis, no mention was made of wave reflection from the far end M of the membrane. But reflection must be considered, as it exists unless means are employed to eliminate it or reduce it to a negligible value. No baffles are shown to simplify the illustration.

In a discussion of sound radiation by a vibrating surface, the deductions from the straight membrane of FIGURE 4 can be applied directly to the conical diaphragms of FIGURES 1, 2, and 3 if these deductions are limited to wave velocity and direction of travel in a plane which is the plane of the drawing for the straight membrane of FIGURE 4, and passing through the axis for the conical diaphragms of FIGURES 1, 2, and 3.

Figure 5A:
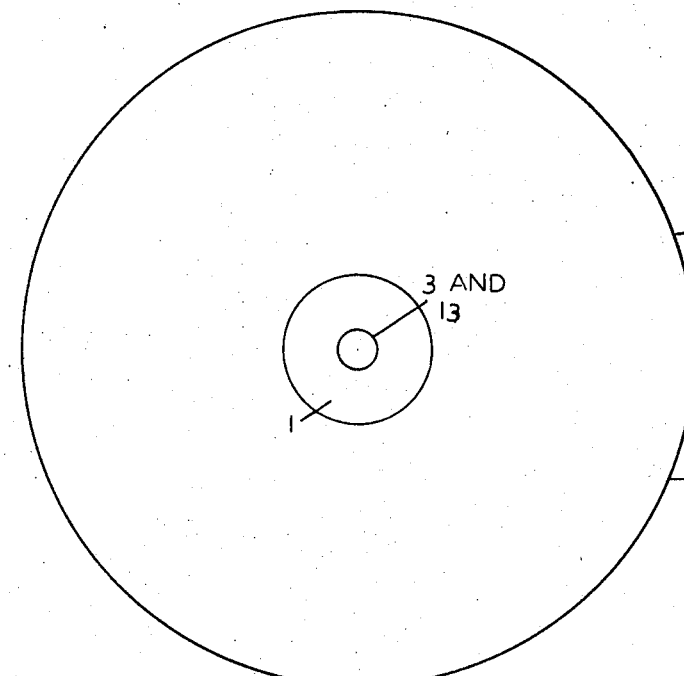
FIGURE 5a shows the sound radiation directional pattern in a plane perpendicular to the axis of the loudspeaker.

FIGURE 5a shows the directional pattern of the new loudspeaker in a plane perpendicular to the axis. This directivity pattern is inherently uniform in all directions because of the circular symmetry of the loudspeaker.

Figure 5B:
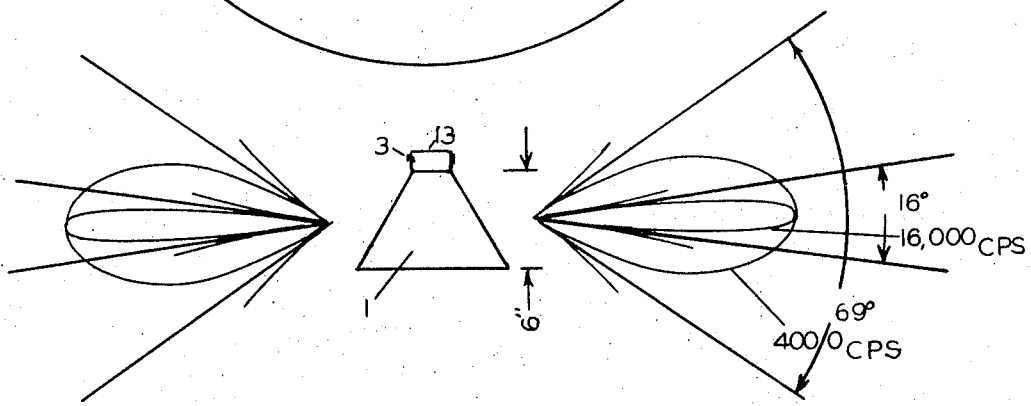
FIGURE 5b shows the directional pattern in a plane passing through the axis.

FIGURE 5b shows the approximate shape of the directivity pattern of the new loudspeaker in the plane of the axis. The width of the main lobe of the pattern is $$2\beta = 2 \sin^{-1} \frac{\text{wavelength in air}}{\text{height of conical diaphragm}}$$

$$= 2 \sin^{-1} \frac{1130 \text{ feet}}{\text{frequency} \times \text{height of conical diaphragm}}$$

For a diaphragm height of 6 inches and a frequency of 16,000 cycles per second, the total beam angular width is 16 degrees. For the same diaphragm height of 6 inches and a frequency of 4000 c.p.s., the beam angular width exceeds 60 degrees.

When in FIGURE 1 a wave travels the full slant radius of the diaphragm and reaches the edge, the energy of the wave is absorbed as completely as possible by the surrounding ring 7 and damping ring means 8. The surrounding ring 7 is very flexible to permit free axial movement of the diaphragm 1 with the correct value of restoring force, and it can be made embodying material of viscosity or mechanical hysteresis such that there will be a large amount of vibratory energy absorption over a wide frequency range. To supplement the absorption by the surrounding ring 7, the means 8 is bonded to the diaphragm at the outer edge and for a distance radially inward, which means 8 can be a ring of material of high vibratory energy absorption. This can be an elastomer of solid or foam texture, or a combination of the two. An example of the foam material is polyurethane foam Nopco No. F-302. To obtain optimum absorption will require careful analysis of available materials considering the frequency range desired, and the temperature range that will probably be encountered in service.

Whatever wave energy is not absorbed by means 7 and 8 will be reflected back in the diaphragm toward the voice coil, and will produce delayed sound waves in the air. However, the major component or directional lobe will be in an upward direction, and will have a reduced effect on the sound reaching the listening zone. The undesirable effects are further reduced by the panel of sound absorbent material 11, which absorbs to some extent the undesired sound.

Analysis indicates that the transverse wave velocity in the diaphragm $v_{td}$ increases as the angle is made steeper or greater. The velocity in the desired direction, usually horizontal, is $v_{td} \times \cos a$, and $\cos a$ decreases as the angle is increased toward 90 degrees. There is therefore an angle at which the horizontal component of velocity, $v_{td} \times \cos a$, is maximum.

Further, as stated previously, the wave velocity varies considerably from the driving circle at the smaller end to the non-driven larger end, usually increasing toward the larger end.

Further, analysis indicates that the wave velocity $v_{td}$ increases when the following factors are varied in the directions indicated: (a) density, decrease; (b) modulus of elasticity in the slant radial direction, increase; and (c) modulus of elasticity in the circumferential direction, decrease.

For optimum coherence and therefore optimum performance, the desired-direction component ($v_{td} \times \cos a$) of velocity should be equal to the velocity of sound in air, $v_a$, which is 1130 feet per second.

To maintain the horizontal component of velocity constant at the desired value, there are several methods that can be used separately or in combination. Among these methods are:

(1) Use for the conical diaphragm a thin sheet of high modulus material of substantially constant thickness, assembled in segments if necessary to obtain the modulus uniform along the various slant radii; bond thereto a layer of material of low modulus and variable thickness, thicker at the larger radius. The high modulus material might, for example, be aluminum, or hard fiber, or paper. The low modulus material might be soft fiber or paper, rubber, plastic, or foamed plastic, or a combination of these materials.

(2) Fabricate the conical diaphragm, perhaps by some molding process, so that the cross section is curved, rather than straight.

The first method can also be useful in adding vibratory energy absorption means at and near the larger end of the conical diaphragm.

Several models were built in general accordance with FIGURE 1. The high excellence of their performance, as judged in listening tests by qualified listeners completely confirms the general concept of this invention.

The construction of these models is given below. Diaphragms are all made in segments to permit uniform orientation of the grain of the diaphragm material, which is necessary to obtain uniformity of wave velocity. The felted fiber or paper diaphragms were made with the grain in the radial direction, while the aluminum diaphragms had the grain in the circumferential direction. Voice coil tubes were made of 0.002-inch aluminum sheet, and all were 1½ inch in diameter.

Model B. The diaphragm was of felted fiber and had an angle of 60 degrees measured from a plane perpendicular to the axis. The diameter at the larger end was 9½ inches. The voice coil had 60 turns of flattened copper wire 0.0032 by 0.0107 inch. The enclosure contained 13,000 cubic inches. The damping was principally internal within the diaphragm fiber.

Model J. The diaphragm was of felted fiber and had an angle of 60 degrees. The diameter at the larger end was 6 inches. The voice coil had 35 turns of No. 35 aluminum wire 0.0056 inch in diameter. The enclosure contained 6400 cubic inches. Damping was both internal in the diaphragm fiber and in the surrounding flexible edge.

Model L. The diaphragm was of aluminum sheet, 0.002 inch thick, and had an agle of 70 degrees. The diameter at the larger end was 6 inches. The voice coil had 35 turns of No. 35 aluminum wire, 0.0056 inch in diameter. The enclosure contained 6400 cubic inches. Damping was by the flexible surrounding edge, and by a circular disc of polyurethane foam, 1 inch thick and 5½ inches in diameter, cemented into the larger end of the conical diaphragm.

Model M. The diaphragm was of aluminum sheet, 0.002 inch thick, and had an angle of 70 degrees. The diameter at the larger end was 6 inches. The voice coil had 60 turns of flattened copper wire, 0.0032 by 0.0107 inch. The enclosure contained 6400 cubic inches. Damping was by three means as follows: (1) A tapered strip of foamed polyurethane, cemented around the inside of the larger end of the conical diaphragm. The width was 2 inches. The thickness was ¾ inch at the end of the conical diaphragm tapered down to ⅛ inch at the other side of the strip. (2) A layer of elastomer on the inside of the conical diaphragm. (3) The surrounding flexible ring of energy absorbing material.

The low end of the useful frequency range of all of these loudspeakers is approximately 40 cycles per second. The upper end was about 14,000 c.p.s. for Models B and J, 16,000 c.p.s. for Model M, and 34,000 c.p.s. for Model L. The frequency range of the Model L extending to 34,000 c.p.s., well beyond any person's audibility limit, confirms the theory that this new loudspeaker can be designed for any frequency range desired, although at some sacrifice of efficiency for wider ranges.

The listening tests previously mentioned showed that all the models had listening quality considerably superior to the best conventional loudspeakers. This superiority is due very largely to the improvement in transient effects brought about by the coherent production of the sound waves, and to the 360-degree diffusion pattern.

The sound source of the new loudspeaker is effectively a vertical line, the axis of the conical diaphragm, which is small compared to the frontal area of a conventional loudspeaker. But the new loudspeaker in a room sounds larger, and the effect of "sound coming out of a tunnel" characteristic of conventional loudspeakers is absent. Also, there is a noticeable effect of the music seeming to fill the room, due to reflections from all of the walls.

In stereo reproduction with conventional loudspeakers, it is considered necessary for the best stereo effect to sit very close to a line equally distant from both loudspeakers. With the new loudspeakers, with their 360-degree diffusion, this is not necessary, and the stereo effect is excellent at most locations in the room.

Loudspeaker Models L and M, which have aluminum diaphragms, exhibit a considerable superiority over Models B and J, and all conventional loudspeakers, in the precise and distinct quality of voice and music reproduction. In reproducing orchestral or choral music, the individual instruments and voices stand out more, and are more easily identified by the listener. This seems to be due to the better linearity of the stress-strain characteristices of aluminum as compared with those of felted fiber, which is substantially a paper. The better linearity of the diaphragm material results in better coherence, lower transient effects, and lower distortion, all of which add up to more precise reproduction.

A loudspeaker is usually considered to be an electro-acoustical transducer whose function is to change electrical energy of the audio-frequency input signal to acoustical energy of sound waves in free air.

But a loudspeaker is actually two transducers. The first is an electromechanical transducer which changes the electrical energy of the audio-frequency electrical signal to vibratory mechanical energy, which in wave form reproduces the waveform of the electrical audio signal. It feeds vibratory energy—motion—to the second transducer.

The second is a mechanical-acoutical transducer which converts the vibratory mechanical energy to acoustic energy in the form of sound waves in free air. The waveform of the sound pressure should, ideally, reproduce the waveform of the electrical audio-frequency signal. This invention relates primarily to the mechanical-acoustical transducer.

The mechanical-acoustical transducer is almost always a truncated conical diaphragm, with the vibratory force applied at a driving circle, which is the smaller end of the cone. This driving circle is also the diameter of the voice coil, which is the moving element of the electro-mechanical transducer.

The conical diaphragm of conventional loudspeakers is usually fiber or paper consisting of felted cellulose fibers, treated with lacquer, and of the order of 0.005 to 0.030 inch thick. Some diaphragms, particularly those used with small-throat horns or those exposed to severe atmospheric conditions, are made of thin metal and/or plastic.

A large percentage of present day diaphragms are straight cones, that is, a radial cross section is a straight line. Some are curved inward, a few are curved outward, and some have double curvature. Some are conical or spherical inside the driving circle. Some, primarily to meet space requirements, are oval or elliptical at the outer edge and circular at the driving circle.

The angle of a cone will be herein considered to be the angle from a plane perpendicular to the axis to a straight line which extends on a slant radius from the driving circle to the outer edge of the cone where the rigid portion and the flexible edge portion join.

This cone angle for medium and large loudspeakers usually lies between 26 and 34 degrees. Smaller loudspeakers, and those used and effective only at high frequencies, called tweeters, are flatter and have angles usually from 25 degrees down to 10 degrees. Elliptical cones may ranges up to 35 degrees at the small radius and down to 10 degrees at the larger radius. Metal and plastic cones are usually less than 25 degrees.

Probably well over 99 percent of all loudspeakers made today are of the dynamic direct radiator type using a vibrating cone diaphragm which projects the sound from the concave side. The driving force is developed by a voice coil carrying the audio signal current and moving in a magnetic field, and which is attached to the diaphragm at the smaller end of the cone. The sound generated by the convex side of the cone is not utilized and it is kept from mixing with the desired sound from the concave side by a baffle, box, or cabinet of more or less effectiveness as size and cost may dictate.

The sound radiated from the convex side of conventional loudspeakers is of quality so far inferior to the sound from the front or concave side that every attempt to use it was quickly abandoned.

The apparently simple conventional cone diaphragm is actually an extremely complicated vibrating system. N. W. McLachlan said in 1934, "The acoustical behavior of a conical shell with or without a baffle has not yielded to analytical treatment yet." (3) In 1951 Corrington and Kidd said, "Loudspeaker cones are usually designed by means of experimental processes. When a new speaker is to be developed for producing a particular frequency response, it is customary to start with a cone of approximately the desired properties and to modify the shape and paper stock systematically until the response is as close as possible to the desired curve. After this is done, it often happens that there is still something undesirable about the frequency response which is very difficult to correct." (1) These comments have been true up to the time of this development.

A conical diaphragm is a three-dimensional thin circular curved sheet whose surface is of a shape such as would be generated by the rotation of an intersecting straight or curved line about an axis.

Such a surface generated by a curved line is not a true cone, but it is generally called a cone in the industry, and it is included in the term "cone" in this specification. An elliptical or other three-dimensional diaphragm has similar characteristics and is also generally included in the term "cone" in the industry and in this specification.

The cone diaphragm may be molded to shape, pressed into shape, or formed from flat sheet with one or more seams. It is most frequently made of paper or fiber of a cellulose base, but large numbers, particularly those used with horns, are made of metal, plastic, or other material.

The conical diaphragm at low frequencies of the order of 100 cycles per second seems to act as a rigid piston, with all elemental areas substantially in phase. This can be observed under stroboscopic light. As the frequency is increased gradually, the phase of the outer zones can be seen to lag increasingly behind the inner zones as the cone becomes a complex wave transmission line. At the lower frequencies the cone is also a wave transmission line, but the phase angle between the inner and outer zones is very small and all parts seem to be in phase with each other because the dimension of the cone is a very small part of a wavelength.

As the frequency increases to several kilocycles per second, the amplitude of vibration drops rapidly and visual observation becomes difficult. Electrical measuring methods have been developed as will be described later.

At higher audio frequencies there will be several wavelengths between the inner and outer edges—four in a cone 6 inches in diameter, 1.25 inch deep, and having an angle of 31 degrees at 6000 cycles per second according to Corrington. (1)

Further, when the outgoing waves in the diaphragm hit the edge of the cone, they are reflected back inward with little loss of amplitude. This results in standing waves whose peak-to-trough ratios frequently exceed 6. A ratio of 6 indicates that the reflected waves have an amplitude that is 70 percent of that of the outgoing wave.

Further, the modulus of elasticity—and the density of the material—in a single conical diaphragm may vary widely over short distances and in different directions. The differences in velocity resulting from this are two to one and more. These changes of wave velocity over small areas cause the outgoing waves to diverge from straight radial paths which then hit the edge at an angle other than 90 degrees and reflect back into the diaphragm at about the same angle. This gives the wave a tangential component, creating waves which go around the diaphragm circumferentially.

Many conical diaphragms display radial nodes or standing circumferential waves. This shows that there are waves going around the diaphragm in both directions simultaneously. From the several kinds of wave propagation and reflection, the pattern of wave motion is extremely complex, and in practically all cases it is also irregular. This pattern of wave motion changes rapidly as the frequency changes. (4)

As the waves travel through the diaphragm material, they decay in energy and/or in amplitude. The rate of decay is determined by the loss properties of the diaphragm material, among other factors. The reflection from the outer edge of the diaphragm is determined by the loss properties and the mechanical impedance of the edge material and other factors.

The computation of sound pressure at high frequencies at a point in front of the diaphragm would be extremely complex, and it has never been accomplished to my knowledge.

At any listening point the actual sound pressure is the algebraic result of the positive and negative displacements of a large number of small areas, spaced radially about 0.3 inch for a half wavelength at 6000 cycles per second. Each small area is subject to a different combination of two major wave motions—the primary transverse wave moving radially outward, and the reflected wave moving radially inward from the edge—plus two minor motions—the circumferential wave moving clockwise, and the circumferential wave moving counterclockwise. Thus, even the best loudspeakers will show a very irregular response curve with sharp variations of the order of 20 db, or 10 to 1, in sound pressure at several points in the frequency band.

The sound output at high frequencies relative to the output at low frequencies is seriously reduced by the very complex vibrating pattern which causes the various areas of the diaphragm to work against each other, and the large amount of sound cancellation which results. The mechanical loss factors of the diaphragm material, and the edge material, including the effects of impregnating materials, are also controlling factors in the sound output.

Because of this cancellation and the loss effect, loudspeakers that perform well at low frequencies do not perform well at high frequencies. To give good performance over a wide range of frequencies, two or three, or occasionally more, loudspeakers are used, usually employing electrical dividing networks to properly channel the various frequency components of the audio signal.

Usually the loudspeaker for the low-frequency end of the range is called the "woofer" and the loudspeaker for the high-frequency end of the range is caller the "tweeter." The loudspeaker for the middle range of frequencies, if any, is often called the "middler" or "squawker." Tweeters are made with a small diaphragm of harder material, tending to flat diaphragm in an effort, completely experimental, to get better high-frequency response and a wider angle of diffusion of sound.

The beam effect of the concave side of the diaphragm, by concentrating the sound radiation at higher frequencies in a narrow beam, offsets to some degree the sound pressure loss at high frequencies caused by cancellation and interference. This improves the high frequency response on the axis where the performance of loudspeakers is usually measured, but it means that there is a large difference in listening quality at various listening positions.

The enclosure is an integral part of the loudspeaker acoustically since it is usually the limiting factor on low-frequency performance, and a factor in high-frequency performance.

The non-use of the sound from the convex side of the diaphragm leads to the bracket structure usually obstructing the sound paths on the convex side by 50 to 100 percent. The bracket structure on the new loudspeaker should obstruct the outgoing sound paths on the convex side by as little as possible, certainly less than 20 percent.

Transient characteristics have three main effects on the sound produced, (1) the fast start of a tone is made less fast, (2) the fast stopping of a tone is made less fast, and (3) at every starting and stopping of a tone, transient tones or vibrations peculiar to the loudspeaker are excited and these take appreciable time to decay.

The spurious transient tones peculiar to the loudspeaker bear no relation to the signal tones, but they do add a discordant quality which clashes with and degrades the sound reproduction.

When a typical diaphragm is shock vibrated by a single current pulse in the voice coil of about 10 microseconds' duration, the wave produced in the diaphragm is reflected many times, radially out and in, and around the diaphragm in many different directions for perhaps 1/30 second before it decays to one-tenth of its original value. The wave motion at a point on the diaphragm is very irregular and it may cross the zero axis 100 times during this period of time. It contains the transient frequencies peculiar to the loudspeaker. Transients such as this are excited by every sharply rising or falling wavefront in the audio input signal. These transient effects are a major factor in the degradation of quality.

The directivity pattern of the new loudspeaker is inherently uniform around 360 degrees horizontally and excellent and controllable vertically.

The wave energy reaching the edge of the diaphragm is substantially absorbed by suitable means 8 of FIGURE 1, so that little if any is reflected back radially inward. Thereby the undesired delayed transient radiation of the sound by the diaphragm is reduced or eliminated.

The unabsorbed wave energy reflected radially inward in the diaphragm will radiate some sound at the same angle $\theta$ (see FIGURE 4), but in the opposite direction, which will be at an angle well above the horizontal. A sound absorbing sheet 11 of FIGURE 1, mounted above the diaphragm will absorb a substantial part of the undesired delayed sound waves, but little of the desired sound waves radiating horizontally. The wave delivered to the diaphragm by the voice coil transfers some of its energy, actually a small part, to the air coherently as it travels down the diaphragm to the edge. When the wave reaches the edge its useful work is finished. Any further transfer of energy to the air is undesirable because it will produce sound waves that are delayed behind the true waves that have already been projected.

It is therefore desirable to absorb the unradiated wave energy in the diaphragm as completely as possible when it reaches the edge so that no appreciable wave energy is reflected radially inward. This requires that the mechanical impedance of the energy absorbing means 8 should match the mechanical impedance of the diaphragm 1 at their meeting point, and that these impedances should be as purely resistive as possible.

Figure 6:
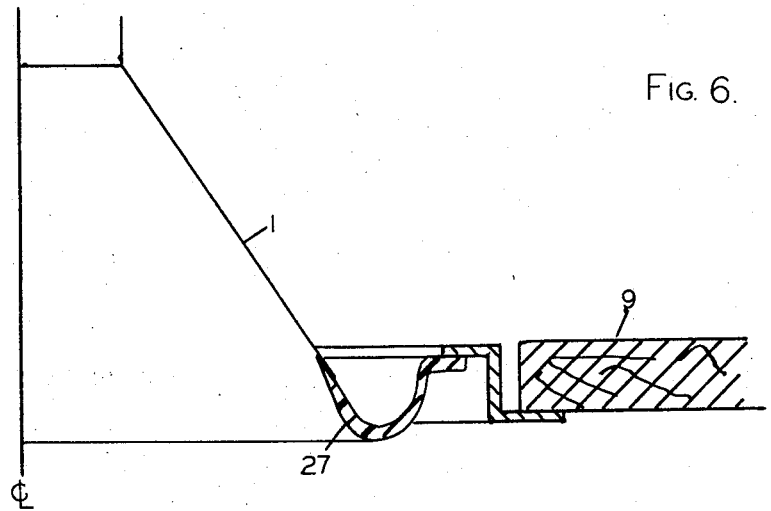
FIGURE 6 is a diagram showing the cross section of the diaphragm and a flexible ring of elastomeric material used for absorbing the vibratory wave at the edge of the diaphragm.

This energy absorption can be accomplished by making a flexible ring 27 surrounding the diaphragm, as shown in cross section in FIGURE 6, of elastomeric material having high mechanical loss when vibrated. The material and density, thickness, loss factors, compliance, and shape would be chosen to give optimum absorption of the wave energy over the frequency range.

The surrounding ring would also serve other purposes. It would hold the larger end of the diaphragm in proper position horizontally. It would hold it in the proper position vertically with some of the compliance needed to determine the low frequency resonance characteristic of the loudspeaker. And it would prevent leakage of air or low-frequency sound waves between the diaphragm and the loudspeaker mounting ring which is fastened to the baffle enclosure 9.

Figure 7:
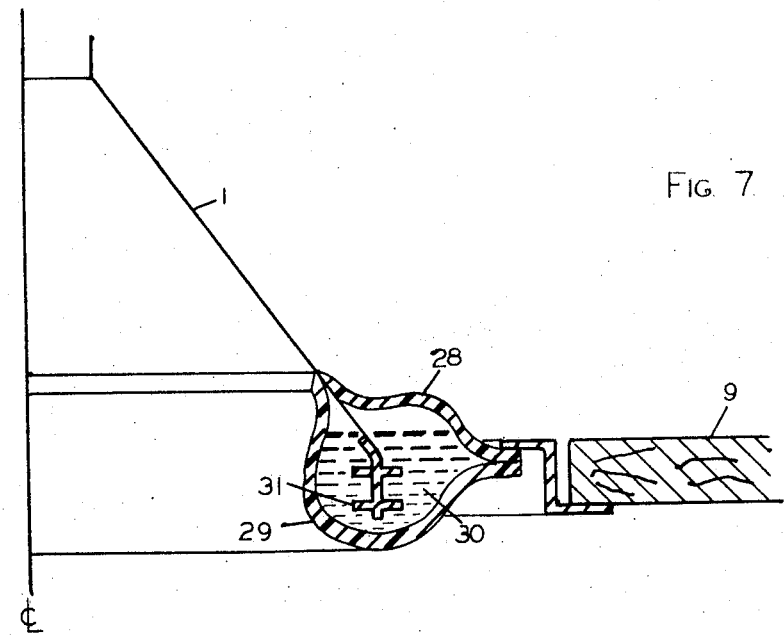
FIGURE 7 is a diagram showing the cross section of the diaphragm and a hollow flexible ring containing a fluid in which a section of the ring moves with turbulence for absorbing the vibratory wave at the edge of the diaphragm.

The energy absorption at the diaphragm edge could also be accomplished by a combination of fluid and elastomer damping along the lines shown in FIGURE 7. The ring sections 28 and 29 made of elastomer having desirable compliance and loss properties, hold the fluid 30 in which the ring 31 moves with turbulence.

The problem of eliminating or reducing the reflection of wave energy in the diaphragm by absorbing the energy in the body of the diaphragm or in energy absorbing material at the non-driven end has some points of similarity to the problems in electrical high-frequency transmission lines.

Transmission line problems and their solutions are well understood. When a uniform transmission line is terminated in a pure resistance whose value in ohms equals the characteristic impedance of the line, reflection will be zero.

Similarly, the diaphragm has an impedance at the non-driven end that can be expressed in mechanical ohms. It can be measured by suitable apparatus, or it can be calculated along the lines of the method described later in connection with FIGURE 9. Or a two-dimensional model along the lines of that figure can be constructed that will simulate the three-dimensional diaphragm, and will make possible simple measurements of mechanical impedance that can be scaled to calculate the impedance of the actual diaphragm. Then the mechanical reactance and resistance of the energy absorbing material (8 of FIGURE 1) should be determined experimentally to obtain the optimum absorption of wave energy over the desired frequency range.

The diaphragm is not a uniform transmission line due to its changing diameter. Energy absorption should be optimum over moderate ranges of temperature, depending on the intended use of the loudspeaker. Absorption should be optimum over a wide frequency range.

In the electrical transmission line, the matching value of terminating resistance is critical to obtain low reflections. The voltage standing wave ratio (VSWR) is the usual way of stating reflection. It is the ratio of peak-to-valley values in the standing wave pattern. The value 1.0 expresses zero reflection.

Where it is difficult to obtain a precise matching termination, high loss may be built into the transmission line itself. Then the combination of the best obtainable termination loss plus the heavy loss in the line can reduce the reflection of the electrical wave to a satisfactory value.

Considering the difficulties of the problem of eliminating reflections of wave energy in the diaphragm, it may be desirable to utilize this technique of high losses along the line—diaphragm—with the best obtainable loss at the termination—edge. This might be accomplished by high loss material in the diaphragm itself, or by distributing some high loss elastomeric material in various areas of the conical diaphragm.

Any sudden change in mass per unit radius will cause some reflection of wave energy. Therefore the energy absorbent material (8 of FIGURE 1) should be attached with tapered or coarsely serrated edges.

The damping might also be accomplished by magnetic damper means. Or any other means may be used to minimize reflections, and still be within the scope of this invention.

Figure 8:
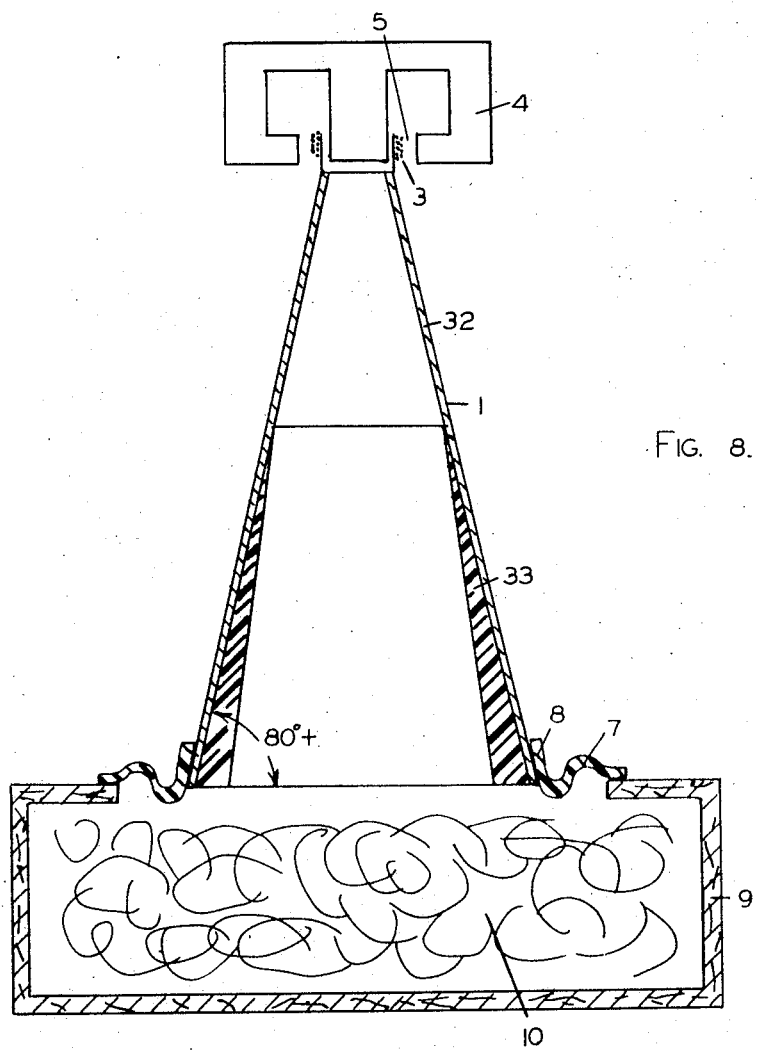
FIGURE 8 is a diagram of another physical configuration of this invention.

A loudspeaker might be constructed with a conical diaphragm of thin hard aluminum 1, to which are bonded a layer of paper 32 and a tapered layer of solid or foamed polyurethane 33, three feet or more in height, and having a cone angle of 80 degrees or higher, along the lines shown in FIGURE 8. The diaphragm material or materials might be made highly energy absorbent, so that little wave energy at 16,000 cycles per second reaches beyond 6 inches from the voice coil end, and little energy at 4000 cycles per second reaches beyond 24 inches from the voice coil end. Some damping might still be required at the edge for lower frequencies.

Then the vertical diffusion of sound would be sufficient at high frequencies in spite of the very high conical diaphragm, and degradation factors would be very low in value.

A single very large coherent-sound loudspeaker might be built to serve a stadium of 100,000 listeners with high quality music and voice. It might have a vertically oriented conical diaphragm with an angle of 60 to 80 degrees, a diaphragm diameter of approximately 60 inches and a height of 60 inches. The diaphragm might be of a composite aluminum and elastomer to substantially attenuate 16,000 c.p.s. waves in a vertical distance of 3 to 6 inches, and 4000 c.p.s. waves in 12 to 14 inches, to obtain good diffusion of sound vertically. It would inherently have uniform diffusion in all directions horizontally. Its frequency range might cover 60 to 16,000 c.p.s. and it could handle well an electrical input of 500 watts with extremely low transient effects and other types of distortion. Its uniformity of response might well be about 1 db over the rated frequency range.

In the construction of a typical loudspeaker along the lines of that shown in FIGURE 1, the voice coil tube 13 on which the voice coil is wound, is directly attached to the diaphragm at its smaller end, and applies an axial force to the diaphragm 1 proportional to the instantaneous audio signal current in the voice coil. FIGURE 2 shows a section through the voice coil and the diaphragm on the center line.

The motion of the voice coil 3 and of the point A 15 on the diaphragm 1 close to the voice coil tube 13 is substantially parallel to the axis. The motion is alternating, but it is shown as a single vector 16 to simplify the diagram and the explanation. The motion vector 16 of point A 15 may be broken down into two components, transverse 18 perpendicular to the diaphragm surface, and longitudinal 17 parallel to the surface and to a slant radius.

Point A 15 has a third component of motion, circumferential, which is due to non-uniformities in material and construction as previously described, and it will not be considered in analysis. This circumferential motion should be considered and measured in development work. In a conventional loudspeaker this circumferential motion causes radial loops and nodes which have some effect on the sound output. The coherent-sound loudspeaker should be practically free of these circumferential wave motions because of the almost complete damping and wave energy absorption at the edge of the diaphragm.

The transverse component 18 displaces air and thus produces sound waves in the air. The longitudinal component 17 does not of itself displace air and therefore does not produce sound waves in air. The transverse and longitudinal components are coupled together by the hoop compliance of the conical diaphragm, which is derived from the circumferential modulus of elasticity, so that one cannot exist without the other. The rigidity and general characterstics of a cone, and its usefulness as a loudspeaker diaphragm are due almost entirely to this hoop compliance.

The transverse and longitudinal components of the wave, while they are coupled closely to each other, do vary in their phase relations at various radii, and thus they may be said to travel at slightly different velocities. Thus, a point close to the voice coil tube 13 travels on a line parallel to the axis. Points further out on the diaphragm travel in ellipses, which are different in angle of major axis and dimensions for each radius and each frequency, due to changes in the magnitude and relative phase of the transverse and longitudinal components of the wave as it travels outward.

The velocity of wave propagation at a point on a conical diaphragm is determined primarily by the following factors:

(1) Density of diaphragm material.
(2) Longitudinal modulus of elasticity parallel to the surface of the diaphragm along the slant radius, $E_1$.
(3) Longitudinal modulus of elasticity parallel to the surface of the diaphragm in the circumferential direction, $E_2$.
(4) Cone angle $a$, measured from a plane perpendicular to the axis.
(5) Radius of the conical diaphragm at the point under consideration.
(6) Frequency of the audio signal.
(7) Thickness of the diaphragm.
(8) Modulus of elasticity in bending along a slant radius, $E_3$.
(9) Modulus of elasticity in shear along a circumferential line, $E_4$.
(10) Density of the air.
(11) Loss properties of the diaphragm material.

The first six factors are the major determinants of velocity. Probably in most cases the inclusion of the other factors would change the determination of velocity less than the variations that are usually present due to non-uniformity of material.

Figure 9:
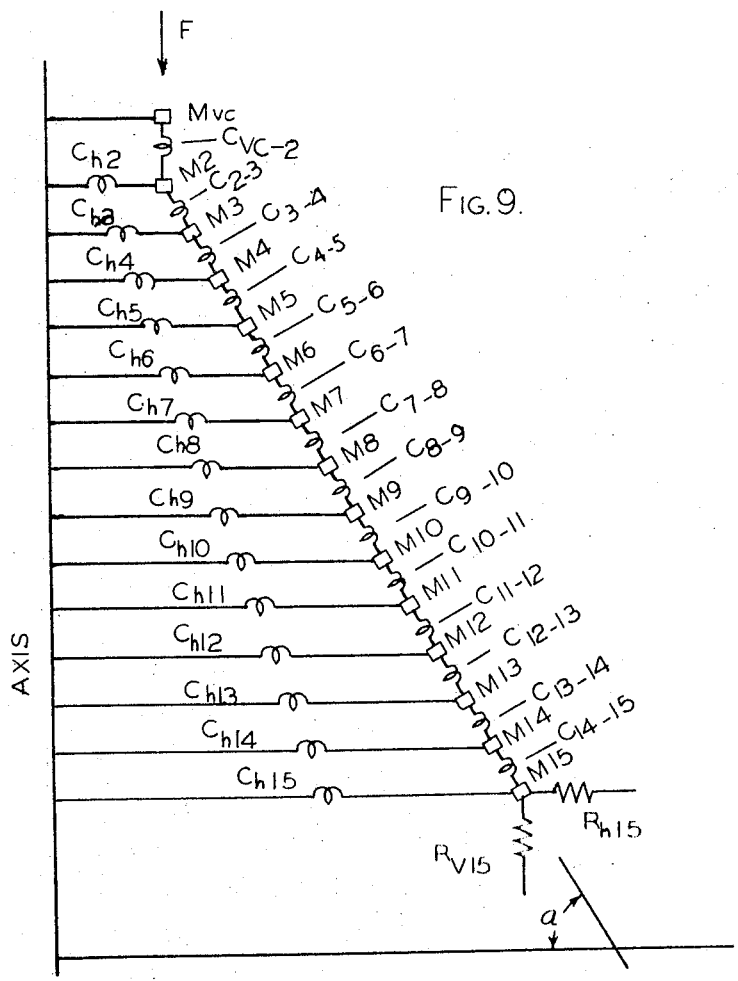
FIGURE 9 is a diagram showing a two-dimensional representation of the diaphragm cross section used in the mathematical analysis of diaphragm action.

It has not been possible to write a mathematical expression for wave velocity in a conical diaphragm, but a solution can be obtained by a method of "successive finite integration in reverse." This method reduces the three-dimensional cone to a two-dimensional structure as shown in FIGURE 9. FIGURE 9 is a diagram showing the equivalent mechanical circuit as if the entire conical diaphragm were folded back upon itself around the axis into a plane to form a two-dimensional structure on one side of the axis. The resulting two-dimensional slant structure then represents the entire three-dimensional conical diaphragm. This structure illustrates the part played by the circumferential compliance, or "hoop stress," in coupling the transverse and longitudinal components of the wave motion, and also its part in slowing down the wave velocity.

The diaphragm is divided into a number of circular zones, each zone of such length along the slant radius that it contains not more than 45 degrees of the traveling wave of the frequency under consideration, with the values of the various properties lumped for each zone. FIGURE 9 shows that the conical diaphragm is actually of the form of a longitudinal wave transmission line modified by the circumferential compliances, which have the effect of producing the transverse sound producing motions and reducing the velocity of the wave propagation.

The mass of each zone in the actual conical diaphragm is distributed over a small distance radially, over a small distance axially from a reference plane, and over 360 degrees of circumference. The reference plane might be taken as a plane through the center of the voice coil and perpendicular to the axis. In the equivalent mechanical circuit this mass should be assumed to be concentrated at a point, such as one of the points designated M in FIGURE 9. The distance of the point from the axis is equal to the average radius of the zone. Its distance from the reference line horizontal through the center of the voice coil is equal to the average distance of the zone from its reference plane. The voice coil mass should be assumed to be concentrated on the reference line and at a distance from the axis equal to its average radius.

Each pair of successive masses are connected to each other by a compliance which is equal to the actual compliance of the diaphragm material measured on the slant radius from the center line of one zone to the center line of the other zone of the pair of masses. This compliance is derived from the modulus of elasticity measured longitudinally along a slant radius $E_1$, the thickness of the diaphragm material, the radius of the zone, and the width of the zone along a slant radius.

In FIGURE 9 the alternating force delivered by the voice coil is designated by the single-ended vector marked F; the masses are designated $M_2$, $M_3$, $M_4$, and so on; and the compliances between masses are designated $C_{2-3}$, $C_{3-4}$, and so on. The mass of the voice coil is designed $M_{vc}$, and the compliance between the voice coil and $M_2$ is designated $C_{vc-2}$. For simplication the mass of the voice coil tube is assumed to be equally divided between the mass of the voice coil and $M_2$. Attached to the outermost mass $M_{15}$ are two purely dissipative elements, one vertical $R_{v15}$, and one horizontal $R_{h15}$.

Each mass is connected to the axis, assumed to be rigid, by a compliance designated $C_{h2}$, $C_{h3}$, $C_{h4}$, and so on, representing the hoop compliance. These hoop compliance equivalents are derived from the modulus of elasticity, longitudinal, measured along a circumference $E_2$, the cone angle $a$, thickness, radius of the zone, and the width of the zone along a slant radius.

Now assume that $C_{14-15}$ exerts a vibratory force $F_{s14-15}$ at frequency $f$ on mass $M_{15}$. Determine the motion of $M_{15}$, considering the forces exerted by the hoop compliance $C_{h-15}$, and the dissipative elements $R_{v15}$ and $R_{h15}$. The dissipative elements are each made approximately equal in mechanical ohms to eight times the mechanical reactance of the mass $M_{15}$.

Next, from the compliance $C_{14-15}$ and the motion of $M_{15}$ determine the motion of $M_{14}$ necessary to generate the force $F_{s14-15}$ in the compliance $C_{14-15}$.

Next, determine the force $F_{s13-14}$ in the compliance $C_{13-14}$ necessary to generate the motion required at $M_{14}$, considering the hoop compliance $C_{h14}$.

Next, determine the motion of $M_{13}$ necessary to generate the force $F_{s13-14}$ in the compliance $C_{13-14}$.

And similarly up the equivalent mechanical circuit of the conical diaphragm to determine the force required at the voice coil to generate the motion at $M_{15}$ and the chain of actions in between.

This series of computations will relate the voice coil driving force to the motion of every element of the equivalent mechanical circuit under conditions of low reflection from $M_{15}$. Varying the values of the dissipative elements $R_{v15}$ and $R_{h15}$ will vary the amount of reflection from the edge over a wide range, from a free edge condition of high reflection, through a condition of minimum reflection, to a fixed edge condition of high reflection. The effects of these changes in dissipation will be seen in the pattern of waveforms that emerges when the motions are plotted.

The wave velocity is also then determinable, as well as the relations between the transverse and the longitudinal components of the wave.

The computations may be repeated in similar manner considering the stiffness along a slant radius, the conical diaphragm losses, and the air loading.

This method of "successive finite integration in reverse" can be used on any conical diaphragm analysis, subject only to the limitations that the conical diaphragm is round, and that the material in each zone is uniform around the 360 degrees of the circle.

The model of FIGURE 9 can also be used as a basis for a two-dimensional mechanical model which would permit a study at low frequency and large amplitude of the wave action that occurs in conical diaphragms at high frequencies and extremely small amplitudes.

To obtain optimum conical diaphragm action requires that the moduli of elasticity radially and circumferentially be uniform, but not necessarily equal to each other. Similarly, the material density and thickness should be uniform. However, the conical diaphragm may be designed to have different properties in various zones.

Inspection of FIGURE 9 discloses that for a given weight per unit area of diaphragm, wave velocity increases as the radial modulus of elasticity increases. And the velocity decreases as the hoop or circumferential modulus increases.

Measurements of wave action at high frequency and low amplitude can be made by means of the following method:

Attach fine wires to the diaphragm surface by adhesive, or by pressing them against the diaphragm with a small air-filled balloon or with a light foam elastomer. Place the magnet close to the wides so that the wires lie in a magnetic field of suitable direction and strength. Feed the voltage generated in the wire by movement in the magnetic field through a step-up transformer to one trace of a two-trace oscilloscope. Feed to the other trace of the oscilloscope the voltage developed across a small resistor in series with the voice coil, or feed the voltage from another pickup wire attached to the diaphragm on some other axis or area.

The relation between the two traces will indicate the relative phase between the signal current and the wave motion of the wires attached to the diaphragm. The height of the trace will indicate the amplitude of diaphragm motion.

This method can be used to measure the wave motion on three axes simultaneously to completely describe the motion of any point on the diaphragm.

In some diaphragms where there is appreciable reflection of wave energy, measurement of wave velocity is difficult. Measurements of velocity can be made using pulses of current of the order of 20 microseconds long in the voice coil. The interval between pulses should be adequate for all vibrations to decay below the level of interference and this can be 50,000 microseconds or more in conventional loudspeakers.

The time of wave travel measured between two points on the diaphragm, at which wires are attached, indicates the velocity between these points. The velocity thus measured with short pulses may or may not be the same as the velocity that exists when the signal is a sine wave, and the velocity with sine waves may or may not vary appreciably with frequency, depending on the physical constants of the diaphragm.

To study the relation of frequency to velocity and damping (energy absorption), the audio signal to the voice coil might well be a sine-wave current of the desired audio frequency, switched on and off in a regular cycle. The on period should be just long enough to complete the measurement of travel time before any reflected wave gets back to the measuring points. The off period should be adequate for decay of the waves to below the level of interference, and again may be 50,000 microseconds or more. The points of switch on and switch off of input current should be at the zero crossover point of the audio cycle to minimize and stabilize the transient effects.

It may be desirable in some designs, in order to improve efficiency at low and medium frequencies or some other characteristic, to give the response characteristic a droop at the high frequencies. It is proper to compensate for a droop of this predictable nature by a compensating rise in the frequency response of the amplifier which feeds the loudspeaker. The power requirements at high frequency are quite small, and this change will not appreciably increase the load on the amplifier. The sound quality will be the same as if the loudspeaker had a flat frequency response curve.

As has been mentioned, most conical diaphragms are made of felted fiber or paper. Some are made of metal, plastic, or similar materials for use outdoors. These latter are usually poor in quality of reproduction, and are not usually used unless necessary. Some metal or plastic diaphragms are used with horns.

The coherent-sound loudspeaker can be designed to give performance of high quality with any type of thin material in the conical diaphragm, such as metal including particularly aluminum alloys, plastic, thin glass film, or combinations of various materials.

The principles of the coherent-sound loudspeaker can also be of value in improving the performance of that type of horn loudspeaker which uses a large diaphragm driver.

A loudspeaker making full use of all the principles of this invention can be designed with the important quality degradation factors reduced to one-tenth or less of those of conventional loudspeakers. A substantial improvement over conventional loudspeakers, however, can be obtained in a loudspeaker using the principles of this invention only partially.

For example, a loudspeaker omitting the heavy damping at the outer edge, but utilizing a cone of conventional fibre or paper, made of adherent fibres, with a cone angle of 50 degrees or more, and a vertically oriented axis will represent a major advance over any conventional single or multi-unit loudspeaker. It will have improved listening quality resulting from the coherence of the diaphragm action, from improved transient response and from better diffusion, even though it does not have the full improvement of the complete invention, nor the ideal wave velocity in the conical diaphragm. It will be lower in cost than the two, three or more units with dividing networks necessary to full range performance with conventional loudspeakers. Such a loudspeaker is within the scope of this invention although it does not utilize all the elements of the invention to the fullest extent.

The addition to such a loudspeaker of a lightweight stiffening ring attached to the larger end of the conical diaphragm will in some cases improve performance by modifying the edge reflection.

I claim:

1. A sound producing device embodying a conical diaphragm having such physical properties, dimensions and shape that vibratory waves propagate along a slant radius in said conical diaphragm at an average speed greater than the speed of sound in the surrounding medium, driving means to deliver vibratory energy to one end of the said conical diaphragm, damping means to absorb the mechanical vibrating energy of the conical diaphragm, a structure which supports the various parts in their proper relationship including a ring which surrounds the said diaphragm and which establishes an annular gap between the said ring and the larger end of the said conical diaphragm, flexible means disposed on said ring and adapted to support the larger end of said conical diaphragm, said flexible means sealing the said annular gap between the larger end of the conical diaphragm and the said ring.

2. A sound producing device as described in claim 1 in which the conical diaphragm is made primarily of metal.

3. A sound producing device as described in claim 1 embodying means at least partially enclosing the concave side of the conical diaphragm, and in which the said supporting structure provides a substantially unobstructed sound path outward from the convex side of the conical diaphragm.

4. A sound producing device as described in claim 1, in which said damping means form a part of the structure of the said conical diaphragm, said damping means being composed of elastomeric material, an enclosure attached to the said ring at least partially enclosing the concave side of the diaphragm.

5. A sound producing device as described in claim 1 embodying sound absorbing means located outward from the smaller end of the conical diaphragm in an area equal in diameter to the inner diameter of the said ring and concentric with said ring.

6. A sound producing device embodying a conical diaphragm, vibrating means to deliver vibratory energy to the conical diaphragm, said vibrating means being attached to the conical diaphragm at a circular driving line, a structure which supports the various parts in their proper relationship including a ring which surrounds the said conical diaphragm and which establishes an annular gap between the said ring and the larger end of the said conical diaphragm, flexible means disposed on said ring and joined to the larger end of the said conical diaphragm, said flexible means sealing the annular gap between the larger end of the said conical diaphragm and the said ring, the angle of the conical diaphragm to a plane perpendicular to its axis being at least 50 degrees as determined by a slant radial line connecting the said circular driving line and the line at which the larger end of the conical diaphragm is joined to the said flexible means, an enclosure attached to said ring at least partially enclosing the concave side of the conical diaphragm.

7. A sound producing device as described in claim 6, embodying damping means forming part of the structure of the said conical diaphragm to absorb mechanical vibratory energy in the said conical diaphragm, said damping means being composed of elastomeric material.

References Cited

UNITED STATES PATENTS

| | | | |
|---|---|---|---|
| 2,775,309 | 12/1956 | Vilchur | 181—31.1 |
| 2,832,843 | 4/1958 | Miessner | 179—115.5 |
| 3,032,136 | 5/1962 | Hegeman | 181—31.1 |
| 2,297,972 | 10/1942 | Mills | 179—116 |

KATHLEEN H. CLAFFY, *Primary Examiner.*

A. McGILL, *Assistant Examiner.*